US007119469B2

(12) United States Patent
Ortt et al.

(10) Patent No.: US 7,119,469 B2
(45) Date of Patent: *Oct. 10, 2006

(54) STATOR ASSEMBLY WITH AN OVERMOLDING THAT SECURES MAGNETS TO A FLUX RING AND THE FLUX RING TO A STATOR HOUSING

(75) Inventors: Earl M. Ortt, Bel Air, MD (US); Michael J. Agnes, Bel Air, MD (US); Hung Du, Reisterstown, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/113,412

(22) Filed: Apr. 22, 2005

(65) Prior Publication Data

US 2005/0189831 A1    Sep. 1, 2005

Related U.S. Application Data

(63) Continuation of application No. 10/702,379, filed on Nov. 5, 2003, now Pat. No. 6,903,475, which is a continuation-in-part of application No. 10/468,643, filed as application No. PCT/US02/05029 on Feb. 22, 2002, now Pat. No. 7,038,343.

(60) Provisional application No. 60/433,496, filed on Dec. 13, 2002, provisional application No. 60/271,141, filed on Feb. 23, 2001.

(51) Int. Cl.
*H02K 1/17* (2006.01)

(52) U.S. Cl. ............................ 310/154.08; 310/154.12; 310/154.17; 310/43

(58) Field of Classification Search ................ 310/154.08–154.13, 154.21, 43; 264/271.1, 264/272.11, 272.15, 272.19, 272.2, 255
See application file for complete search history.

(56) References Cited

U.S. PATENT DOCUMENTS

| 787,184 A | 4/1905 | Jacobson |
| 3,258,623 A | 6/1966 | Phelon et al. |
| 3,296,471 A | 1/1967 | Cochardt |

(Continued)

FOREIGN PATENT DOCUMENTS

DE    6 601 157    2/1969

(Continued)

OTHER PUBLICATIONS

Composite magnet holder simplifies motor assembly. Retrieved Nov. 26, 2001 from http://www.machinedesign.com/content/columns/articleloader.asp?main=sitesearch&origA.

(Continued)

*Primary Examiner*—Tran Nguyen
(74) *Attorney, Agent, or Firm*—Harness, Dickey & Pierce, P.L.C.

(57) ABSTRACT

A stator assembly for an electric motor includes a stator housing, a flux ring inserted into the stator housing after the stator housing is formed and a plurality of magnets on an inner surface of the flux ring. Overmold material is molded around the magnets in the flux ring, such as by injection molding. The overmold material secures the magnets to the flux ring and the flux ring to the housing. In an aspect, the overmold material is molded to form at least one of a commutator end or rear bearing support, front bearing support and fan baffle.

11 Claims, 5 Drawing Sheets

U.S. PATENT DOCUMENTS

| | | | |
|---|---|---|---|
| 3,390,291 A | 6/1968 | Eberline et al. | |
| 3,422,294 A | 1/1969 | Parker | |
| 3,436,815 A | 4/1969 | M.W. Sheets | |
| 3,445,692 A | 5/1969 | Kato | |
| 3,445,693 A | 5/1969 | Crawshaw et al. | |
| 3,510,707 A | 5/1970 | Stone | |
| 3,710,291 A | 1/1973 | Nicoud | |
| 3,766,418 A | 10/1973 | Apostoleris | |
| 3,789,250 A | 1/1974 | Macoit et al. | |
| 3,878,802 A * | 4/1975 | Schmitt et al. | 29/521 |
| 3,887,826 A | 6/1975 | Apostoleris | |
| 4,012,651 A | 3/1977 | Burson | |
| 4,015,154 A | 3/1977 | Tanaka et al. | |
| 4,155,021 A | 5/1979 | Corbach et al. | |
| 4,159,562 A | 7/1979 | Liptak et al. | |
| 4,209,724 A | 6/1980 | Periou | |
| 4,219,752 A | 8/1980 | Katou | |
| 4,260,916 A | 4/1981 | Theissig | |
| 4,323,806 A | 4/1982 | Aoki | |
| 4,383,192 A | 5/1983 | Sikorra | |
| 4,453,097 A | 6/1984 | Lordo | |
| 4,464,595 A | 8/1984 | Hamano et al. | |
| 4,573,258 A * | 3/1986 | Io et al. | 29/596 |
| 4,591,749 A | 5/1986 | Gauthier et al. | |
| 4,594,525 A | 6/1986 | Stokes | |
| 4,625,392 A | 12/1986 | Stokes | |
| 4,665,333 A | 5/1987 | Heim et al. | |
| 4,683,393 A | 7/1987 | Stokes | |
| 4,724,348 A | 2/1988 | Stokes | |
| 4,757,603 A | 7/1988 | Stokes | |
| 4,769,624 A | 9/1988 | Merritt et al. | |
| 4,777,717 A | 10/1988 | Okamoto | |
| 4,792,712 A | 12/1988 | Stokes | |
| 4,793,054 A | 12/1988 | Abbratozzato et al. | |
| 4,795,932 A | 1/1989 | Long | |
| 4,801,834 A | 1/1989 | Stokes | |
| 4,827,173 A | 5/1989 | Corbach et al. | |
| 4,850,100 A | 7/1989 | Stokes | |
| 4,873,461 A * | 10/1989 | Brennan et al. | 310/47 |
| 4,877,986 A | 10/1989 | Shimizu | |
| 4,879,485 A | 11/1989 | Tassinario | |
| 4,910,861 A | 3/1990 | Dohogne | |
| 4,916,344 A | 4/1990 | Hammer et al. | |
| 4,918,801 A | 4/1990 | Schwarz et al. | |
| 4,953,284 A | 9/1990 | Hammer et al. | |
| 4,954,736 A | 9/1990 | Kawamoto et al. | |
| 4,973,872 A | 11/1990 | Dohogne | |
| 5,038,460 A | 8/1991 | Ide et al. | |
| 5,075,605 A | 12/1991 | Hendricks et al. | |
| 5,121,021 A | 6/1992 | Ward | |
| 5,264,749 A | 11/1993 | Maeda et al. | |
| 5,268,607 A * | 12/1993 | McManus | 310/89 |
| 5,334,897 A * | 8/1994 | Ineson et al. | 310/89 |
| 5,341,561 A | 8/1994 | Schorm et al. | |
| 5,353,491 A | 10/1994 | Gentry et al. | |
| 5,475,276 A | 12/1995 | Shiga et al. | |
| 5,584,114 A | 12/1996 | McManus | |
| 5,646,467 A | 7/1997 | Floresta et al. | |
| 5,705,970 A | 1/1998 | Nishida et al. | |
| 5,714,827 A | 2/1998 | Hansson | |
| 5,731,646 A | 3/1998 | Heinze et al. | |
| 5,806,169 A | 9/1998 | Trago et al. | |
| 5,811,908 A | 9/1998 | Iwata et al. | |
| 5,828,152 A | 10/1998 | Takeda et al. | |
| 5,831,364 A | 11/1998 | Buse | |
| 5,845,389 A | 12/1998 | Roberts et al. | |
| 5,861,695 A * | 1/1999 | Brassard | 310/156.43 |
| 5,874,794 A | 2/1999 | Trammell et al. | |
| 5,942,827 A | 8/1999 | Neumann et al. | |
| 5,960,532 A | 10/1999 | Hill | |
| 5,998,902 A | 12/1999 | Sleder, Sr. et al. | |
| 6,002,185 A | 12/1999 | Nakao et al. | |
| 6,006,416 A | 12/1999 | Katagiri | |
| 6,020,661 A | 2/2000 | Trago et al. | |
| 6,058,594 A | 5/2000 | Neumann et al. | |
| 6,060,799 A | 5/2000 | McManus et al. | |
| 6,177,751 B1 | 1/2001 | Suzuki et al. | |
| 6,191,516 B1 | 2/2001 | Froehlich et al. | |
| 6,281,612 B1 | 8/2001 | Asao et al. | |
| 6,522,042 B1 | 2/2003 | Du et al. | |

FOREIGN PATENT DOCUMENTS

| | | |
|---|---|---|
| DE | 19 41 169 C2 | 4/1970 |
| DE | 1 909 063 | 1/1971 |
| DE | 23 02 947 C2 | 8/1973 |
| DE | 23 42 499 | 3/1975 |
| DE | 76 08 871 | 7/1976 |
| DE | 25 05 937 A1 | 8/1976 |
| DE | 75 04 284 | 10/1977 |
| DE | 28 27 068 C2 | 1/1979 |
| DE | 27 35 778 | 3/1979 |
| DE | 28 35 441 A1 | 2/1980 |
| DE | 28 55 986 | 7/1980 |
| DE | 30 23 743 A1 | 1/1982 |
| DE | 31 35 217 A1 | 4/1983 |
| DE | 84 27 703 U1 | 3/1986 |
| DE | 35 10 845 A1 | 10/1986 |
| DE | 39 13 618 C2 | 11/1989 |
| DE | 40 33 454 A1 | 4/1992 |
| DE | 42 13 374 A1 | 10/1993 |
| DE | 42 40 995 A1 | 6/1994 |
| DE | 195 17 668 A1 | 11/1996 |
| DE | 197 05 432 A1 | 8/1998 |
| DE | 198 61 024 | 9/1999 |
| DE | 196 14 217 | 5/2000 |
| DE | 199 11 261 C2 | 9/2000 |
| DE | 199 42 029 A1 | 3/2001 |
| DE | 199 51 594 | 5/2001 |
| DE | 101 03 434 | 8/2001 |
| DE | 100 09 151 C2 | 9/2001 |
| DE | 100 51 308 A1 | 10/2001 |
| DE | 100 53 692 A1 | 5/2002 |
| DE | 101 00 717 | 7/2002 |
| DE | 101 18 275 | 10/2002 |
| DE | 102 16 098 | 10/2003 |
| DE | 102 19 190 | 11/2003 |
| DE | 102 24 867 | 12/2003 |
| DE | 203 13 943 | 2/2004 |
| EP | 0 143 693 A2 | 6/1985 |
| EP | 0 218 477 A2 | 4/1987 |
| EP | 0 410 048 B1 | 1/1991 |
| EP | 0 505 498 B1 | 9/1992 |
| EP | 0 558 746 B1 | 9/1993 |
| EP | 0 569 594 B1 | 11/1993 |
| EP | 0 809 878 B1 | 10/1998 |
| FR | 1 588 988 | 3/1970 |
| FR | 2 445 053 | 7/1980 |
| FR | 2 518 927 | 7/1983 |
| FR | 2 617 344 | 12/1988 |
| FR | 2617344 | 12/1988 |
| GB | 1 389 519 | 11/1973 |
| GB | 1 576 917 | 10/1980 |
| GB | 2202170 | 9/1986 |
| JP | 50-68807 | 6/1975 |
| JP | 54-164828 | 11/1979 |
| JP | 55-56476 | 4/1980 |
| JP | 64-64546 | 3/1989 |
| JP | 3-77247 | 8/1991 |
| JP | 3-265437 | 11/1991 |
| JP | 3-293943 | 12/1991 |
| JP | 09039027 | 2/1997 |
| JP | 10-256031 | 9/1998 |
| JP | 11-299147 | 10/1999 |

| | | |
|---|---|---|
| JP | 2000-152535 | 5/2000 |
| JP | 2001-169485 | 5/2000 |
| JP | 2000-324733 | 11/2000 |
| JP | 2001-69703 | 3/2001 |
| WO | WO/97 05687 | 2/1997 |
| WO | WO 97/45917 | 12/1997 |
| WO | WO 01/56134 | 8/2001 |
| WO | WO 01/080400 | 10/2001 |

OTHER PUBLICATIONS

European Search Report EP 1237252 A3.
International Search Report PCT/US02/05029, ISA/US—mailed Sep. 6, 2002.
Semones, Burley C., Application of high-energy permanent-magnet materials to servomotors, J. Appl. Phys. 57(1), Apr. 15, 1985, pp. 3817-3819.

* cited by examiner

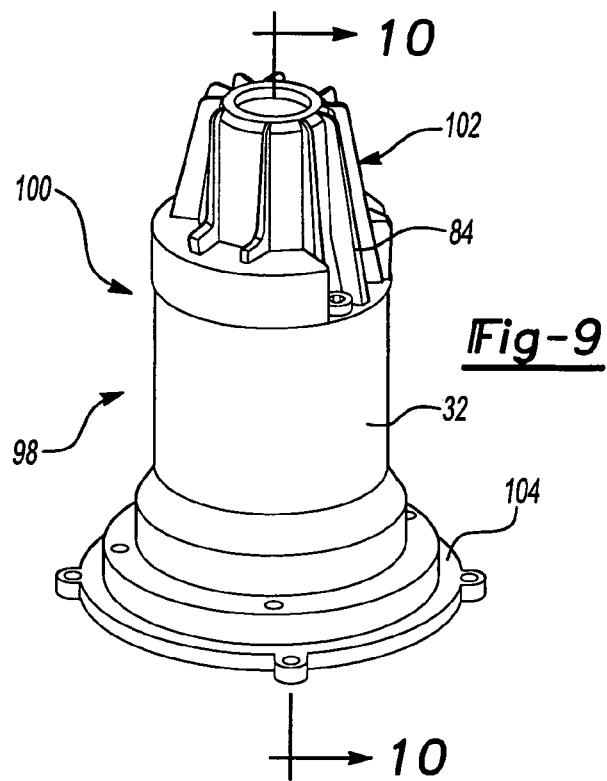
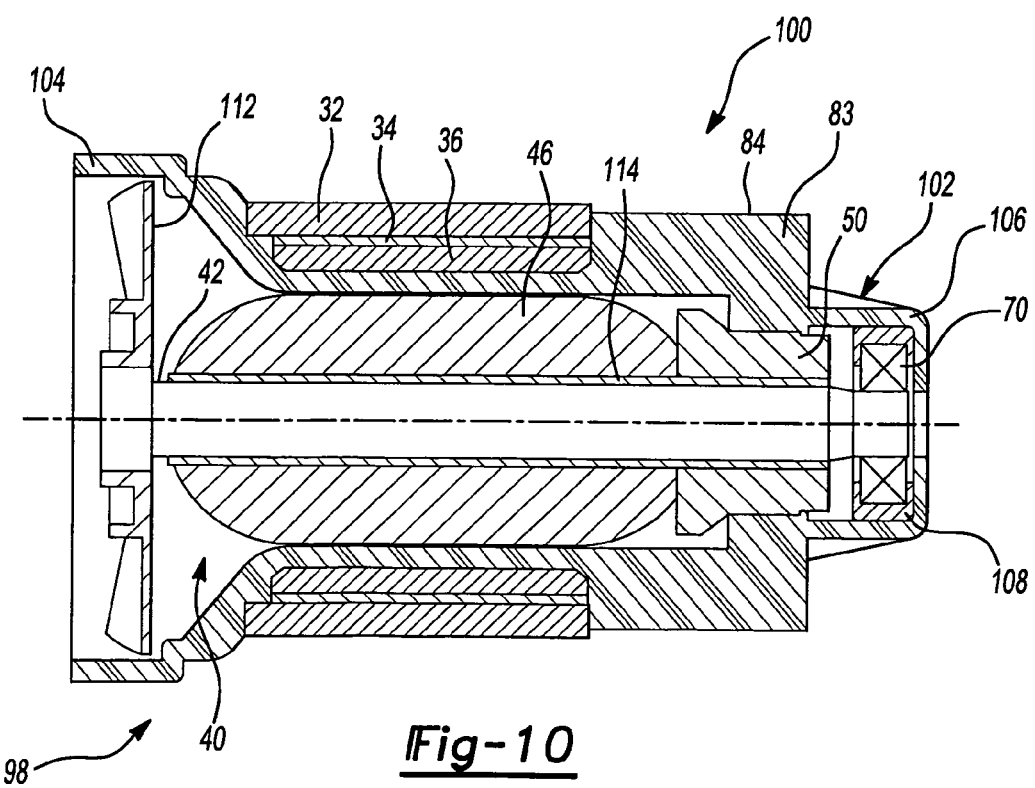

STATOR ASSEMBLY WITH AN OVERMOLDING THAT SECURES MAGNETS TO A FLUX RING AND THE FLUX RING TO A STATOR HOUSING

CROSS-REFERENCE TO RELATED APPLICATIONS

This application is a continuation of U.S. patent application Ser. No. 10/702,379 filed Nov. 5, 2003, now U.S. Pat. No. 6.903,475 which claims the benefit of U.S. Provisional Application No. 60/433,496 filed Dec. 13, 2002 and which is also a continuation-in-part of U.S. patent application Ser. No. 10/468,643 filed Aug. 20, 2003, now U.S.Pat. No. 7,038,343 which is a § 371 National Phase filing of PCT International Application PCT/US02/05029 filed Feb. 22, 2002 (International Publication Number WO 02/068235 A2) which claims the benefit of U.S. Provisional Application No. 60/271,141 filed Feb. 23, 2001. The disclosures of the above applications are incorporated herein by reference.

FIELD OF THE INVENTION

The present invention relates to electric motors, and more particularly to stator assemblies for electric motors.

BACKGROUND OF THE INVENTION

In the construction of stator assemblies for permanent magnet electric motors, magnets are retained within the stator assembly. For example, in a brush-type permanent magnet electric motor, magnets are retained on a stator housing or a separate flux ring within the stator housing. This generally requires gluing or adhering each individual magnet to the flux ring or stator housing.

Various types of adhesives have been used to adhere the magnets to the metallic surface. It is possible that a sudden shock to the electric motor will destroy the bond between the magnet and the flux ring or stator housing. This would result in movement of the magnet within the stator assembly. The magnet itself could even break. As a result, the electric motor ceases to properly function.

It is known in the art to provide an anchor in the flux ring or stator housing. Magnetic material is then injection molded on the flux ring or stator housing and is retained in position by the anchor. Such an anchor system is disclosed in U.S. Pat. No. 6,522,042 issued Feb. 18, 2003 entitled Anchoring System for Injection Molded Magnets on a Flux Ring or Motor Housing and in U.S. application Ser. No. 09/764,004 filed Jan. 17, 2001 entitled Anchoring System for Injection Molded Magnets on a Flux Ring or Motor Housing. However, a disadvantage of the anchoring systems described in the above-identified patent applications is that they require the use of injection molded magnetic material. This is typically the most expensive type of magnetic material per unit flux.

SUMMARY OF THE INVENTION

Accordingly, the present invention provides a stator assembly for an electric motor. The stator assembly includes a stator housing, a split flux ring inserted into the stator housing and a plurality of magnets on an inner surface of the flux ring. An overmolding secures the magnets to the flux ring and asserts a radial force on the flux ring to secure it to the stator housing. Additionally, the overmolding fills the seam of the flux ring and prevents collapse of the flux ring.

In an aspect of the invention, the material used to mold the overmolding is a plastic that is injection molded about the magnets on the flux ring after the flux ring and magnets have been placed in the stator housing. The pressure of the plastic as it is being injection molded exerts a radial pressure on the flux ring, expanding it against the stator housing and secures it to the stator housing. The overmolding also secures the magnets to the flux ring.

In an aspect of the invention, the flux ring is aligned with the stator housing and is further secured to it by engagement of a dimple in one of the flux ring and stator housing with a hole in the other of the flux ring and the stator housing.

In an aspect of the invention, at least one of a rear bearing support, front bearing support and fan baffle are integrally molded with the overmolding when the material used to mold the overmolding is molded.

In an aspect of the invention, the overmolding is formed with slots of different widths between magnetic poles of the stator assembly to provide a keying feature for the stator assembly to key it, such as when it is placed in a magnetizer.

In an aspect of the invention, the flux ring and housing are preformed as a unit by stamping them from blanks and rolling them together. In a variation, the flux ring blank is rolled first to form the flux ring and the housing blank rolled around the flux ring with the flux ring acting as a rolling arbor.

In an aspect of the invention, an electric motor has an armature and a stator assembly in accordance with the invention.

In an aspect of the invention, a power tool has a housing including an electric motor having an output coupled to a transmission. The electric motor has an armature and a stator assembly in accordance with the invention.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 9 is a perspective view of an electric motor having an alternative configuration of the stator assembly of FIG. 2;

FIG. 10 is a cross-sectional view of the electric motor of FIG. 9 taken along the line 10—10;

DETAILED DESCRIPTION OF THE PREFERRED EMBODIMENTS

The following description of the preferred embodiments is merely exemplary in nature and is in no way intended to limit the invention, its application, or uses.

Figure 1:
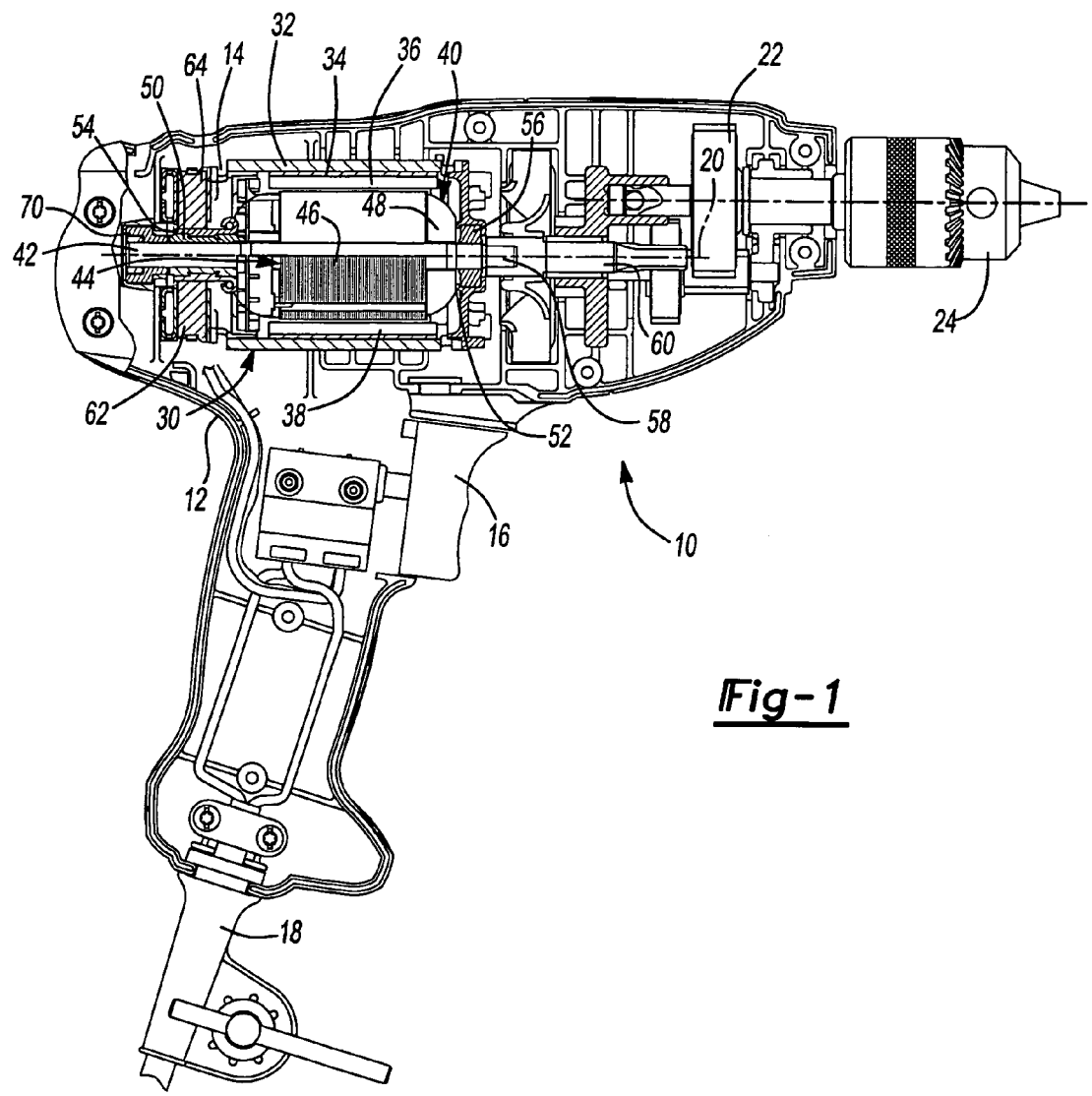
FIG. 1 is a cross-sectional view of a power tool according to the present invention.
Figure 2:
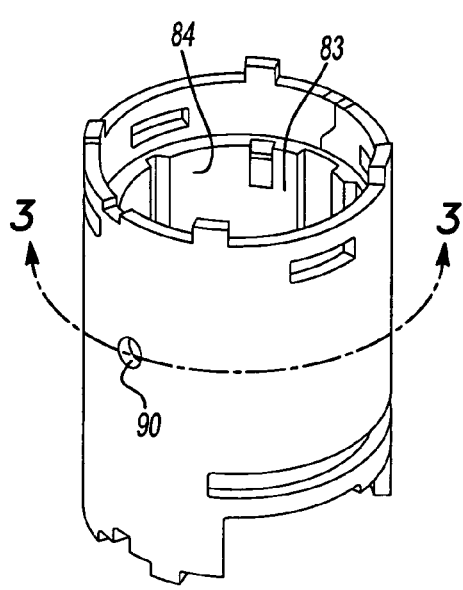
FIG. 2 is a perspective view of a stator assembly of the power tool of FIG. 1.

Referring now to FIG. 1, a power tool 10 is shown. The power tool 10 is illustrated as a drill, however, any type of power tool may be used in accordance with the present invention. The power tool 10 includes a housing 12 which surrounds a motor 14. An activation member 16 is coupled with the motor and a power source 18. The power source 18 includes either a power cord (AC current) or includes a battery (DC current) (not shown). The motor 14 is coupled with an output 20 that includes a transmission 22 and a chuck 24. The chuck 24 is operable to retain a tool (not shown).

The motor includes a stator assembly 30. The stator assembly 30 includes a stator housing 32, a flux ring 34 and magnets 36. The flux ring 34 is an expandable or split flux ring. An armature 40 includes a shaft 42, a rotor 44 and a commutator 50 coupled with the shaft 42. The rotor 44 includes laminations 46 and windings 48. The motor 14 also includes end plates 52 and 54. End plate 52 includes a front bearing 56 which supports one end of a shaft 42. The shaft 42 is coupled with a pinion 60 that is part of the output 20. Brushes 62 and 64 are associated with the commutator 50. A rear bearing 70 is also coupled with the end plate 54 to balance rotation of the shaft 42.

Referring now to FIGS. 2–6, the stator assembly 30 is described in further detail. Stator housing 32 and flux ring 34 are illustratively made of soft magnetic material, such as cold rolled steel. The flux ring 34 has anchors 80 extending radially inward. The magnets 36 are disposed around an inner surface 82 of the flux ring 34 between anchors 80. An overmolding 84 secures the magnets 36 to flux ring 34 as described in more detail in WO 02/068235 A2.

Figure 8:
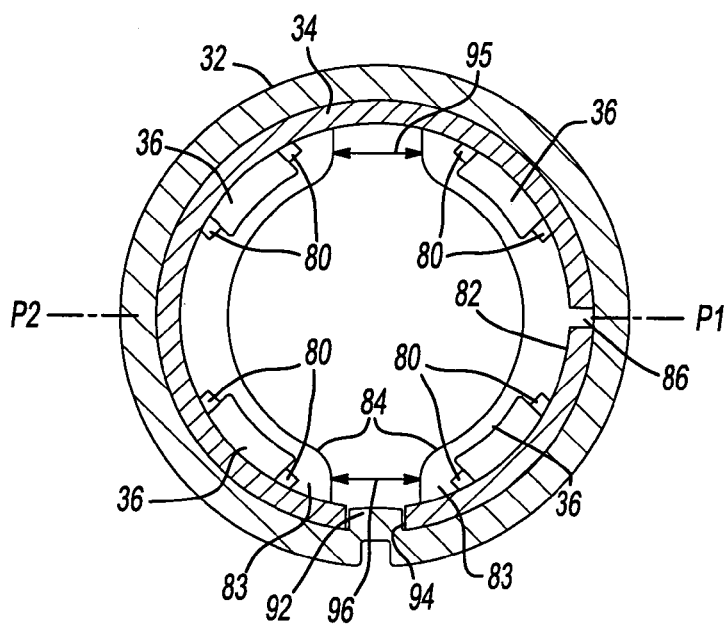
FIG. 8 is a cross-sectional view of an alternative configuration of the stator assembly of FIG. 2.

The flux ring 34 is discontinuous having a seam 86 extending therealong. The seam 86 enables the flux ring 34 to be compressed for insertion into the stator housing 32. When flux ring 34 is assembled in stator assembly 30, the seam 86 is preferably disposed over one of magnetic poles $P_1$, $P_2$ of the stator assembly 30 to minimize magnetic losses. In the configuration of FIGS. 2–6, the flux ring 34 includes a projection or dimple 88 that engages a hole 90 in the stator housing 32. Alternatively, as shown in FIG. 8, the stator housing 32 includes a projection or dimple 92 that engages a hole 94 in the flux ring 34. Engagement of the dimple 88,92 and hole 90,94 provides proper alignment of the flux ring 34 during assembly of the stator assembly 30. The dimple 88, 92 and hole 90, 94 are illustratively at ninety degrees to seam 86 to provide sufficient displacement of dimple 88 or hole 94, as applicable, in flux ring 34 with respect to stator housing 32 when flux ring 34 is compressed so that when flux ring 34 is uncompressed, dimple 88 will be urged into hole 90 (or hole 94 around dimple 92). Alternatively, the dimple 88, 92 and hole 90, 94 are ideally centered over one of the magnetic poles $P_1$, $P_2$ to reduce magnetic losses. Overmolding 84 is formed so there are slots 95, 96 on diametrically opposite sides of flux ring 34 between the overmolding 84 around magnets 36 of pole $P_1$, and the overmolding 84 around magnets 36 of pole $P_2$. Slots 95, 96 illustratively extend axially along inner surface 82 of flux ring 34 between poles $P_1$ and $P_2$. Slots 95, 96 may be gaps in the overmolding 84 or regions of reduced thickness in the overmolding 84. In the illustrative embodiment, stator assembly 30 has one pair of magnetic poles, with one of poles $P_1$ and $P_2$ thus being a North pole and the other being a South pole. It should be understood that stator assembly 30 could have more than one pair of North and South poles.

Figure 5:
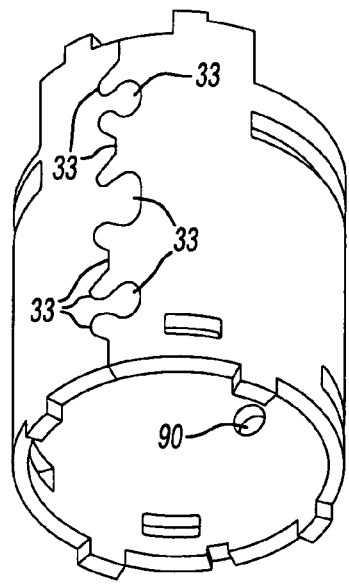
FIG. 5 is a perspective view of a stator can or housing of the stator assembly of FIG. 2.
Figure 6:
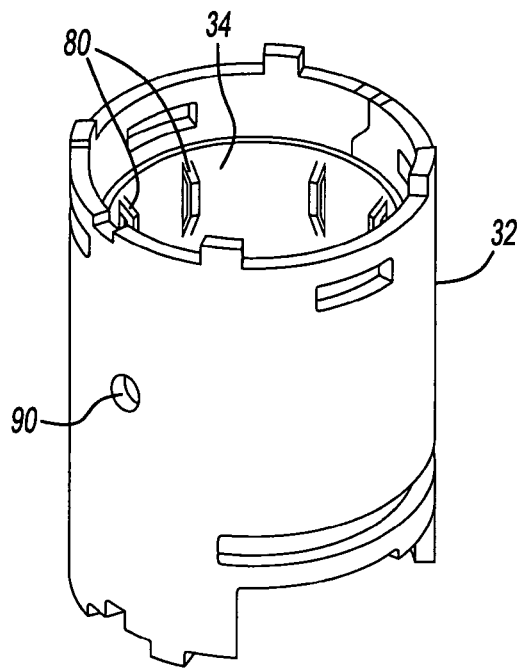
FIG. 6 is a perspective view of the flux ring of FIG. 4 received in the stator can of FIG. 5.

To assemble the stator assembly 30, stator housing 32 and flux ring 34 are each preformed. In this regard, stator housing 32 illustratively has interlocking fingers 33 as shown in FIG. 5. The flux ring 34 is slightly compressed and inserted into the stator housing 32 as shown in FIG. 6. The dimple 88, 92 engages the hole 90, 94 as described above. The magnets 36 are placed against the inner surface 82 of the flux ring 34 and are positioned between the anchors 80. The magnets 36 can be lightly magnetized so they are retained against the inner surface 82 of flux ring 34 during assembly.

Overmold material 83, such as plastic, is injection molded into the stator assembly 30 to form the overmolding 84. During the injection molding process, the pressure of the overmold material 83 pushes against the magnets 36 and flux ring 34, expanding the flux ring 34 against the stator housing 32. The overmold material 83 fills the seam 86 of flux ring 34 and surrounds the magnets 36. Expansion of the flux ring 34 against the stator housing 32 provides the retention force for retaining the flux ring 34 within the stator housing 32. Further, because the overmolding 84 fills the seam 86 of the flux ring 34, compression of the flux ring 34 in the stator housing 32 is prevented after the overmold material 83 hardens, thus preventing the removal of flux ring 34 from the stator housing 32. The engagement of the dimple 88, 92 and hole 90, 94, held in place by the overmolding 84, further secures the flux ring 34 to the stator housing 32. The diameter and true position of the overmolding 84 are maintained closely relative to the inside diameter of the stator housing 32 to reduce tolerance stack-ups to the armature 40 (FIG. 1). It should be understood that there can be more than one dimple/hole arrangement in flux ring 34 and stator housing 32.

Figure 3:
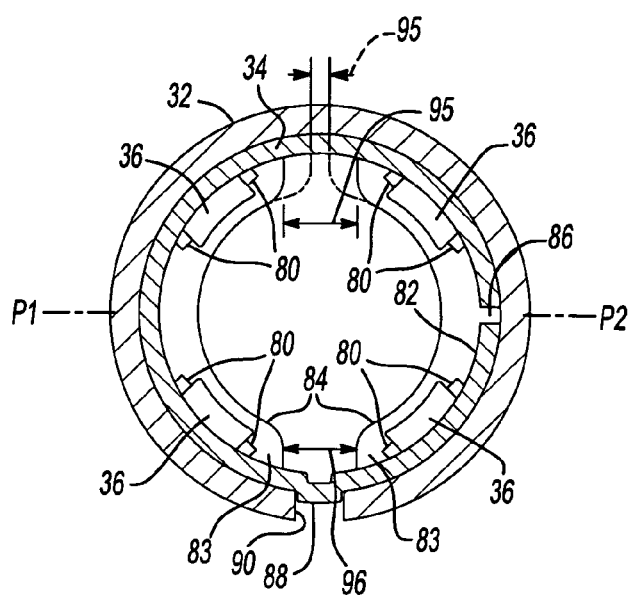
FIG. 3 is a cross-section view of the stator assembly of FIG. 2 taken along the line 3—3.
Figure 4:
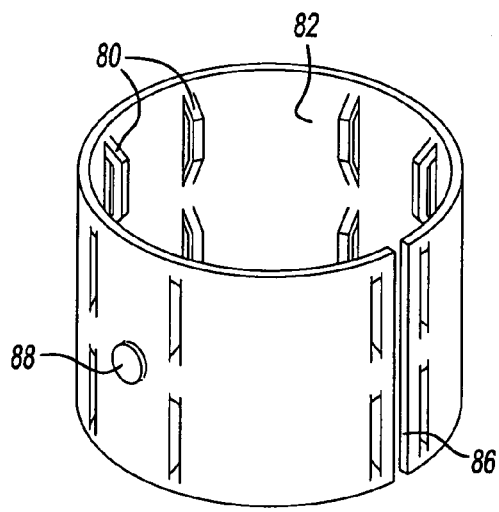
FIG. 4 is a perspective view of a flux ring of the stator assembly of FIG. 2.

In an aspect of the invention, slot 95 is wider than slot 96 (as shown in phantom in FIG. 3 with respect to slot 95). This limits to two the orientations in which stator assembly 30 can be placed in a magnetizer (not shown) used to magnetize magnets 36 after stator assembly 30 is assembled. That is, the difference in the widths of slots 95 and 96 provide a keying feature that keys stator assembly 30 to the magnetizer. If the widths of slot 95 and 96 were the same, stator assembly 30 could be placed in the magnetizer in four orientations. That is, either end of stator assembly 30 could be placed in the magnetizer in two orientations that are 180 degrees apart. By forming the keying feature in the overmolding 84, each end of the stator assembly 30 can be placed in the magnetizer in only one orientation, reducing to two the orientations in which the stator assembly 30 can be placed in the magnetizer. This makes sensing of the stator assembly 30 in the magnetizer fixture more robust and eliminates the possibility of magnetizing backwards due to placing the stator assembly 30 in the magnetizer in the wrong orientation. It should be understood that in stator assemblies having more than two poles, preferably the width of only one of the slots between the poles would be different than the widths of the rest of the slots between the poles to key the stator assembly to the magnetizer.

Figure 7:
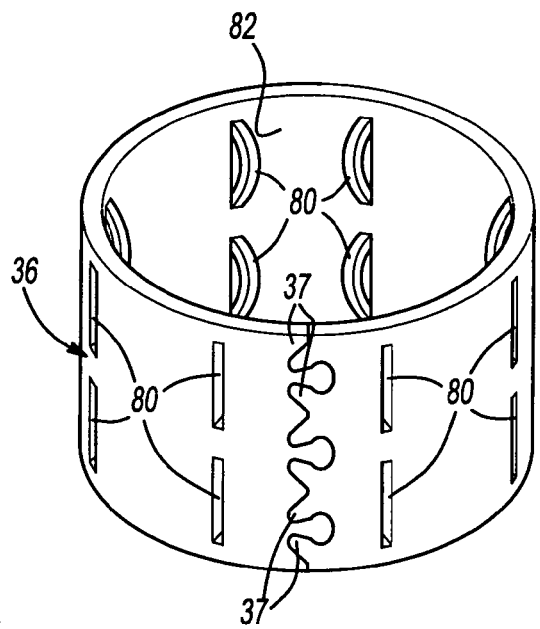
FIG. 7 is a perspective view of a variation of the flux ring of FIG. 4 showing a flux ring with interlocking fingers.

In an aspect of the invention, the stator housing 32 and the flux ring 34 are preassembled as a unit according to an alternative assembly method. More specifically, the stator housing 32 and flux ring 34 are formed of separate blanks, such as steel blanks, and in this regard, the edges of the seams of flux ring 34 and stator housing 32 are formed to have interlocking fingers, such as interlocking fingers 33 shown in FIG. 5 for stator housing 32 and interlocking fingers 37 shown in FIG. 7 for flux ring 34. One or more holes 94 are stamped into the flux ring and matching mating dimple(s) 92 stamped in the stator housing 32, or vice-versa. The stator housing 32 and flux ring 34 are lain together in their flat, pre-rolled states with the holes and dimples engaged. The stator housing 32 and flux ring 34 are rolled and the seam of the flux ring 34 interlocks as does the seam of the stator housing 32. The holes and dimples maintain alignment of the stator housing 32 and flux ring 34 during the rolling process.

In an alternative, the flux ring 34 can be rolled first and the stator housing 32 rolled about the flux ring 34. In this case, the flux ring 34 acts as a rolling arbor. Additionally, the holes and dimples maintain alignment as the stator housing 32 is rolled about the flux ring 34. According to another alternative, the stator housing 32 and flux ring 34 can be spot-welded together to form a sub-assembly. Regardless of how the stator housing 32 and flux ring 34 are assembled together, injection of the overmold material 83 not only secures the magnets 36 to the flux ring 34 but also secures the flux ring 34 to the stator housing 32 through the pressure exerted on the flux ring 34 therein.

The stator assembly 30 of the present invention provides significant advantages in both assembly and manufacture of the power tool 10. In particular, the stator assembly 30 eliminates the need for welding equipment to secure the components together. The expansion of flux ring 34 against stator housing 32 induced by injection of the overmold material 83 secures the flux ring 34 to stator housing 32 and the overmolding 84 also secures the magnets to flux ring 34. The interlocking of the dimple/hole arrangement(s) further secure the flux ring 34 to the stator housing 32. Further, injection of the overmold material 83 reduces tolerance stack-ups, improving ease of assembly. As a result, manufacturing equipment and floor space is reduced entailing cost savings. Another advantage of reduced tolerance stack-ups is that the magnet can be placed closer to the armature 40 thus maximizing motor performance. The keying feature provided by the different widths of slots 95, 96 improves the placement of stator assembly 30 in the magnetizer.

Turning now to FIGS. 9 and 10, an electric motor 98 having a further embodiment of the stator assembly 30, indicated generally by reference numeral 100, is shown. The stator assembly 100 includes the stator housing 32, flux ring 34, and permanent magnets 36 as shown in the stator assembly 30 of FIGS. 2–6. The stator assembly 100 further includes an integrally molded commutator end or rear bearing support 102 and an integrally molded fan baffle 104. An armature, such as armature 40 (FIG. 1), is received in stator assembly 100. A fan 112 is affixed at one end of shaft 42 of armature 40 and is disposed within fan baffle 104. An insulative sleeve 114 may illustratively be disposed between shaft 42 and laminations 46 and between shaft 42 and commutator 50. An end plate (not shown in FIGS. 9 and 10), such as end plate 52 (FIG. 1), is affixed to fan baffle 104.

The rear bearing support 102 includes a cap 106 integrally molded from the overmold material 83. The cap 106 includes a pocket 108 for receiving rear bearing 70 (FIG. 1). Integrally forming the cap 106 as part of the overmolding 84 from the overmold material 83 eliminates the need for separate fasteners to fix the rear bearing support 102 to the stator housing 32. The fan baffle 104 is likewise integrally molded from the overmold material 83.

Figure 11:
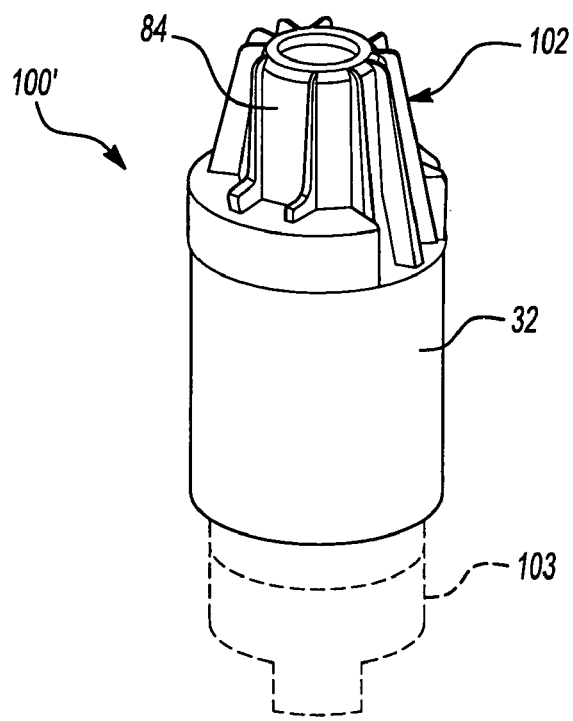
FIG. 11 is a perspective view of an alternative stator assembly.

Turning now to FIG. 11, an alternate embodiment of stator assembly 100 is shown and generally indicated by reference numeral 100'. Stator assembly 100' is substantially similar to the stator assembly 100 shown in FIGS. 9 and 10, however, only the rear bearing support 102 is integrally molded as part of the overmolding 84 from the overmold material 83. Alternatively, a front bearing support 103 (shown in phantom in FIG. 11) for engaging a front bearing, such as bearing 56 (FIG. 1), may be integrally molded in a manner substantially similar to the rear bearing support 102.

Figure 12:
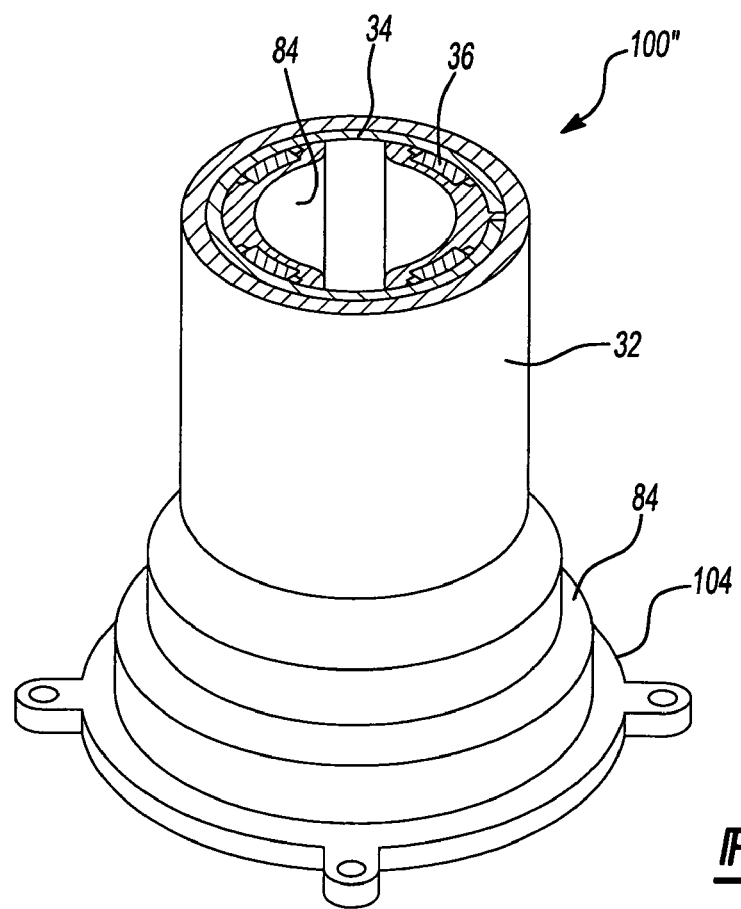
FIG. 12 is a perspective view of still another alternative stator assembly.

With reference to FIG. 12, another alternate embodiment of stator assembly 100 is illustrated and generally indicated by reference numeral 100". Stator assembly 100" is substantially similar to the stator assembly 100 shown in FIGS. 9 and 10, however, only the fan baffle 104 is integrally molded as part of overmolding 84 from the overmold material 83.

By integrally molding the commutator end bearing support 102 and the fan baffle 104 as part of overmolding 84, further assembly and costs savings may be realized.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A stator assembly, comprising:
    a housing;
    a flux ring disposed on an inner surface of the housing wherein the housing and the flux ring are separately formed and the flux ring is disposed on the inner surface of the housing after the housing is formed;
    a plurality of permanent magnets disposed around an inner surface of the flux ring; and
    a material overmolded around the plurality of magnets to secure the magnets to the flux ring and to secure the flux ring to the housing.

2. The stator assembly of claim 1, further including at least one of a rear bearing support, front bearing support and fan baffle integrally formed of the overmold material during molding of the overmold material.

3. The stator assembly of claim 1, further including a rear bearing support integrally formed of the overmold material during molding of the overmold material, the rear bearing support including a cap having a pocket therein for receiving a rear bearing.

4. The stator assembly of claim 1, wherein the overmold material is a plastic.

5. The stator assembly of claim 1, wherein the plurality of magnets includes four magnets, the stator assembly having a first magnetic pole defined by two of the magnets that are adjacent to each other and a second magnetic pole defined by the other two of the magnets that are adjacent to each other, the overmold material molded to have a first slot between the magnets of the first and second magnetic poles on a first side of the flux ring and a second slot between the magnets of the first and second magnetic poles on a second side of the flux ring that is diametrically opposed to the first side of the flux ring, the first and second slots having different widths.

6. A stator assembly comprising:
    a housing;
    a flux ring disposed on an inner surface of the housing wherein the housing and the flux ring are separately formed and the flux ring is disposed on the inner surface of the housing after the housing is formed;

a plurality of permanent magnets disposed around an inner surface of the flux ring;

a material overmolded around the plurality of magnets to secure the magnets to the flux ring; and at least one of a rear bearing support, front bearing support and fan baffle integrally formed of the overmold material during molding of the overmold material.

7. A power tool comprising:

a housing; and a motor disposed within the housing and having an output coupled to a transmission, the motor having a stator assembly having a flux ring disposed on an inner surface of a stator housing wherein the stator housing and flux ring are separately formed and the flux ring is disposed on the inner surface of the stator housing after the stator housing is formed, a plurality of permanent magnets disposed around an inner surface of the flux ring, and a material overmolded around the plurality of magnets to secure the magnets to the flux ring and secure the flux ring to the stator housing.

8. The power tool of claim 7 wherein the stator assembly further includes at least one of a rear bearing support, front bearing support and fan baffle integrally formed of the overmold material during molding of the overmold material.

9. The stator assembly of claim 7 wherein the stator assembly further includes a rear bearing support integrally formed of the overmold material during molding of the overmold material, the rear bearing support including a cap having a pocket therein for receiving a rear bearing.

10. The power tool of claim 7, wherein one of the flux ring and the housing includes at least one projection and the other of the flux ring and the housing includes at least one hole in which the projection is received to align the flux ring in the housing.

11. The power tool of claim 7, wherein the overmold material is a plastic.

* * * * *